March 17, 1953        K. B. PALME        2,632,137
ARRANGEMENT WORKING WITH ALTERNATING CURRENT FOR EQUAL
ANGLED AND REMOTE DIRECTED TORSIONAL ADJUSTMENT
Filed Nov. 5, 1949
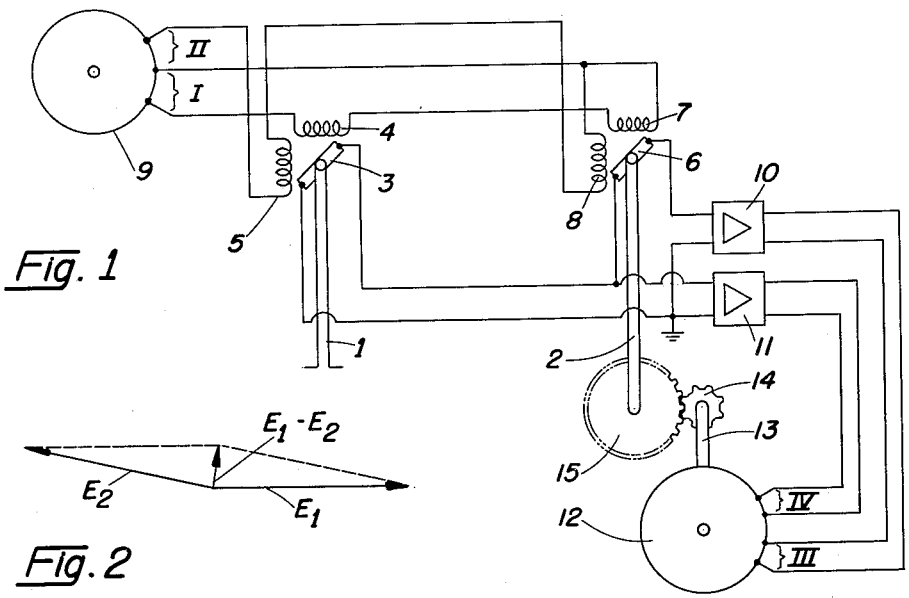
Fig. 1
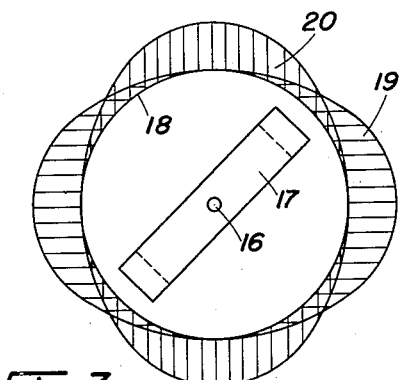
Fig. 2
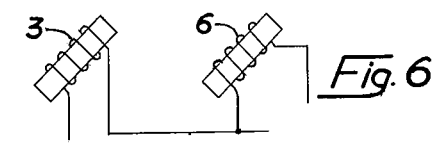
Fig. 6
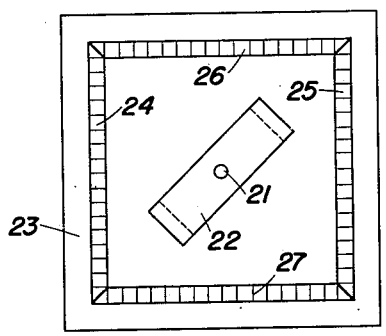
Fig. 3
Fig. 4
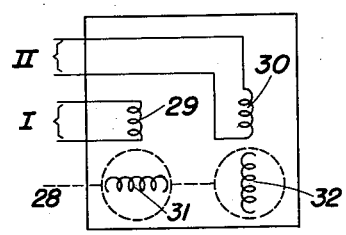
Fig. 5
Inventor
KARL BERTIL PALME
By    *Senger K. Hilbert*
Attorney Patented Mar. 17, 1953

2,632,137

UNITED STATES PATENT OFFICE 2,632,137

ARRANGEMENT WORKING WITH ALTERNATING CURRENT FOR EQUAL ANGLED AND REMOTE DIRECTED TORSIONAL ADJUSTMENT

Karl Bertil Palme, Stockholm, Sweden, assignor to Aktiebolaget Bofors, Bofors, Sweden, a corporation of Sweden Application November 5, 1949, Serial No. 125,696
In Sweden November 10, 1948

2 Claims. (Cl. 318—30)

In a remotely directed machine laying of for instance pieces of ordnance means are generally used which continuously indicate the size of the deviation between the direction intended and the direction attained. For this purpose heretofore arrangements in which a directing shaft and a directed shaft are connected with selsyn elements in different circuits usually have been used. The said shafts are located at a distance from each other. Elements of this kind, however, in themselves do not have the necessary angle exactness to be used in the gear ratio 1:1 in the piece of ordnance concerned if great precision is required by the follower system. In such cases there has been used a combination of a fine system and a coarse system where the coarse system is constituted by a selsyn element geared 1:1 to the shaft directing the piece of ordnance concerned, and the fine system by another element geared a suitable number of times higher. Through this arrangement increased angle exactitude is attained, but at the expense of a large number of mechanical and electrical elements and of inertia at the rotating parts.

Attempts have been made to replace the selsyn elements with angle transmitters which are built according to other principles and good angle exactitude has been obtained with an arrangement in which an alternating current is supplied to the transmitter side, as well as to the receiver side. On each side the current flows through the exciting winding of an angle position indicator or angle transmitter. These windings create a nearly homogeneous and pulsating magnetic field. Furthermore each transmitter has a rotor coil, which is fastened to a shaft located in the winding plane. The said shaft together with the coil is rotatory. It is the angle position of said shaft which is indicated. The coil is in said magnetic field, and its torsional shaft is perpendicular to said field. If the coil or the rotor does not contain iron, the voltage induced in the coil will with great precision be proportional to the sine of the angle between the magnetic field and the winding plane of the coil, and it is possible to make such transmitters so that the induced voltage for the same torsional angle is substantially precisely the same for different copies. The angle difference between the shafts of both sides is obtained from the difference between the rotor voltages, which are in phase. It is then convenient to transmit the rotor voltage of the transmitter side to the receiver side with the aid of a twin conductor. As the voltage varies with the sine of the torsional angle, the connection between the angle error and difference voltage is not unequivocal, but depends partly on the angle difference and partly on the absolute value of the angles. It is therefore not convenient to use a pair of angle transmitters for a larger range than about a quadrant so that for covering one revolution two pairs are required, these pairs being alternately connected with the aid of mechanized changeover switches at the passing from one quadrant to another quadrant. This is a considerable complication; moreover if for several reasons the temperature of the receiver and transmitter is different, and if they have noticeable temperature coefficients, considerable errors can arise.

The disadvantages of the known arrangements are removed by the object of the present invention, which comprises a new arrangement working with alternating current for equal angled and remote directed torsional adjustment of a directed shaft in accordance with the position of a directing shaft. The novelty of the invention is characterized partly in that to each of two shafts there is fastened a rotor winding arrangement with at least one winding coil, which has a winding plane symmetrical to and containing said shaft, whereby the rotor winding arrangement is enclosed by a stator winding arrangement which is made and arranged for creating a rotating magnetic field perpendicular to the shaft and directed through the rotor winding arrangement; the arrangements of the two shafts are mutually as similar as possible, and preferably are arranged to be supplied from the same multiphase alternating current source, whereby in each rotor winding arrangement an alternating voltage is induced, the phase position of which is determined by the angle position of the rotor winding arrangement and of the attaching shaft. Novelty is further partly characterized in that the two rotor winding arrangements are connected in series in such a way that the voltages counteract each other, and are connected to a receiver arrangement to which is consequently supplied an alternating voltage which is the vector difference between the voltages of the two rotor winding arrangements whereby said voltage indicates the size as well as the direction of the angle divergence between the angle positions of the directed and directing shafts, and also partly in that the receiver arrangement is adapted owing to a supplied difference voltage to cause direct or indirect power amplified torsion of the directed shaft in the direction decreasing the angle divergence.

The above mentioned and other characteristics of the invention will be described and explained more precisely in the following, in connection with the description of a number of examples illustrated on the accompanying diagrammatic drawing. Of the five figures of the drawing, Fig. 1 is a schematic view of the circuits in an equipment with a two-phase stator winding arrangement, Fig. 2 is a vector diagram of the voltage conditions on which the invention is based, Figs. 3, 4 and 5 are examples of other rotor and stator winding arrangements which are included in the angle position indicators used, and Fig. 6 is a fragmentary detail of Fig. 1 showing the arrangement and connection therein of the rotor windings.

In Fig. 1, 1 is the directing shaft and 2 the directed shaft. If the arrangement is used for machine laying of a piece of ordnance, the shaft 2 can evidently be constituted by the laying shafts of this piece, while the shaft 1 is constituted by a corresponding shaft of a fire-control instrument which is set up at a distance from the piece. The shafts 1 and 2 respectively, are provided with an angle indication arrangement according to the invention. The said arrangement is constituted by a winding coil fastened at each shaft and accompanying the movement of the shaft. This coil is arranged as a rotor in an attaching stator winding arrangement which has two-phase windings. At the shaft 1 a winding coil 3 is thus fastened which is placed in a stator winding having phase windings 4 and 5, and at the shaft 2 a winding coil 6 is fastened which is placed in a stator winding arrangement having phase windings 7 and 8. A two-phase alternating current source 9 with the phases I and II supplies the said phase windings, whereby the windings 4 and 7 are coupled in series to the phase I, and the windings 5 and 8 are coupled in series to the phase II.

The angle indication arrangements, mutually as similar as possible, are so made that in each of them the two-phase windings create a rotating magnetic field through the winding coil at current feed from the source 9. In the said coil an alternating voltage is created the phase position of which is determined by the angle position of the plane of the winding coil. If the angle position between one of the winding coils and its stator winding arrangements is the same as the one between the other of the winding coils and its stator winding arrangements, the two induced alternating voltages will thus have the same angle position.

The winding coils 3 and 6 are connected in series with each other and with the terminals of an amplifier 10 supplied from a current source (not shown). The coupling in series of the coils is carried out in such a manner that the induced voltages of the coils are directed against each other when the coils mutually have the same angle position. The amplifier 10 will owing to this be fed a voltage which is equal to the vector difference between the voltages of the coils 3 and 6. If $E_1$ designates the voltage induced in the coil 3, and $E_2$ the one in the coil 6, the vector voltage difference equals zero when the coils have the same angle position and produce voltages of the same size. If there is an angle difference between the angle positions of the coils 3 and 6, the induced voltages will not be in phase, and the vector difference $E_1-E_2$ will never be zero. This last mentioned circumstance is illustrated in the vector diagram of Fig. 2. If the angle difference is small, the phase position of the difference voltage $E_1-E_2$ will be substantially 90° in the phase displacement from each of the phase positions of the voltages $E_1$ and $E_2$. The phase position of the difference voltage $E_1-E_2$ is in this case before or after e. g. the phase position of the voltage $E_1$ as the angle position of the directed shaft is before or after the directing shaft.

The coil 3 of the directing shaft is also connected to an amplifier 11. The amplified output voltages of the two amplifiers 10 and 11 are connected to the terminals III and IV of a two-phase motor 12, the two-phase windings of which are connected to said terminals. The motor 12 will rotate its shaft when the difference voltage $E_1-E_2$ is not zero, in one or the other direction, as the voltage $E_1-E_2$ is before or after the voltage $E_1$. The voltage $E_1$ is to be regarded as a reference voltage for the voltage $E_1-E_2$. The shaft 13 of the motor 12 drives the shaft 2 through gearing 14, 15 and the direction of rotation of the motor 12 is so chosen that the motor always turns the shaft 2 in the direction in which the difference voltage $E_1-E_2$ is decreased.

In order to get a quick change of direction of the directed shaft 2, with maintained angle correctness and without oscillations at quick changes of the angle movements of the directing shaft, the amplifiers 10 and 11 may be supplemented with a coupling arrangement based upon known adjustment principles and adjustment means. By these additional means (not shown), not only the phase position of and the size of the difference voltage $E_1-E_2$, but also the time derivates of the said voltage can be used for the purpose of adjustments. Also auxiliary devices can be resorted to by means of which not the difference voltage itself but only its component, perpendicular to the reference voltage, is used for the adjustment. In this case the manner of action is independent of any difference between the sizes of the voltages $E_1$ and $E_2$. This characteristic contributes to the maintenance of a great degree of accuracy especially in cases where size differences arise as a consequence of resistance changes caused by temperature differences or the like. The amplifiers 10 and 11 may conveniently be electron tube amplifiers, and the amplifier 10 may have a greater degree of amplification than the amplifier 11.

The arrangement described can evidently be regarded as functioning according to a zero method. This fact, combined with the circumstance that the amplifiers 10 and 11 can be arranged for a very great amplification of the voltages $E_1-E_2$ and that $E_1$ evidently gives the arrangement especially great sensitivity and insures the correct angle will be obtained at the adjustment. This characteristic is in this case obtained simultaneously as the coils only need to exert exceedingly small directing moments on the shafts 1 and 2. The last-mentioned condition is often of greatest significance especially for the directing shaft.

As at remotely directed torsional adjustment there are in most cases very high demands as to the angle exactitude of the adjustment, it is often of very great importance in carrying out the invention to use an embodiment thereof which by aid of simple means secures the angle exactitude. For this purpose it is among other things advantageous if the two angle-indicating arrangements use a common current source, and each phase winding of the one stator winding arrangement is connected in series with the equally situated phase winding of the other stator-winding arrangement. This applies even if the angle indicating arrangements are placed at a great distance from each other. By the said connections errors are avoided which otherwise could arise owing to the different curve forms of the alternating voltage of different sources, as well as different phase positions, which are caused by differences in the performance of the angle-indicating arrangements etc. The alternating source can be placed either at one or the other angle-indicating arrangement or at another place. In practice it is generally most convenient to place the source at one angle-indicating arrangement. If in this case the distance between the angle-indicating arrangements is large, increased angle exactitude is obtained by disposing at the one or at both of the stator winding arrangements phase correcting impedances. Each of these impedances may e. g. be connected in parallel with a phase winding. Furthermore the impedances may be so dimensioned that the rotating magnetic fields of the two stator winding arrangements are maintained at the greatest possible phase identity.

Owing to the above mentioned reasons it may be advantageous to counterbalance the resistance differences and the impedance differences of the current circuits of the rotor-windings. These differences may arise through the impedance and resistance of the lines between the angle-indicating arrangements.

By selecting the frequency of the feeding alternating current source very high e. g. 500 to 1000 cycles per second, there is gained in addition to the advantage of transmitting quick angle changes also the advantage that the angle speed of the rotor shafts is low in comparison to the speed of the rotating magnetic field. This means that the alternating voltage induced in the rotor winding arrangement gets a high and constant frequency whereby the dimensioning of the amplifiers is made easier and their reliability of service is greater.

The rotating magnetic field necessary for the invention can of course be created by three-phase or polyphase stator winding arrangements as well as by two-phase stator winding arrangements. The problem of making angle-indicating arrangements which mutually have exactly the same configuration for the rotating magnetic fields and thereby secure greater angle exactitude, is facilitated by two-phase feed. For the same purpose it is advantageous if a phase-shifting network is coupled between the alternating current source and the stator winding arrangements. The said network may be arranged to cause a phase shift of exactly 90° between the voltages of the two phases. The condition of the phase shift of 90° is important to observe even if the two-phase alternating current is created from a single-phase alternating current source by the aid of known phase splitting apparatus. It is preferable that the feeding alternating voltage have a sine form as pure as possible, and be free from harmonics.

The desire to attain a very high angle exactitude is accompanied by the requirement that the individual angle-indicating arrangements shall be as similar as possible and it is desirable to fulfil this requirement without resorting to designs troublesome in respect to manufacturing.

An example of an angle-indicating arrangement for two phase feed, which is to be preferred in respect to the above mentioned requirements, is shown in Fig. 3. 16 is the shaft of the rotor winding arrangement. The said shaft is perpendicular to the plane of the paper. 17 is a winding coil fastened to the said shaft. The said coil constitutes the rotor winding arrangement. The stator winding arrangement is constituted by a winding arrangement with the phase windings 19 and 20, the conductors of which are perpendicular to the plane of the paper. The last mentioned winding arrangement is placed around a cylindrical rotor space. The stator-winding arrangement is made in such a way that the winding closeness of one phase winding varies with the sine for the angle running around the said space and the winding closeness of the other phase winding with cosine for the said angle.

At the correct feeding current there is thus obtained a rotating magnetic field, the representing vector of which describes a circle.

Another example of an angle-indicating arrangement for two-phase feed, which is easy to manufacture, is shown in Fig. 4. In this figure, 21 is the shaft of the rotor winding arrangement and 22 a winding coil fastened thereto. The rotor-winding space is surrounded by a pipe 23 with preferably quadratic cross section. The said pipe is preferably made of laminated iron, has preferably walls of a uniform thickness and is placed symmetrically to the shaft 21 of the rotor. The axis of the pipe has the same direction as the shaft of the rotor. One phase winding 24, 25 has its conductors located along two opposite inner walls of the tube and the other phase winding 26, 27 has its conductors located along the other two opposite inner walls. In the arrangement described, a rotating magnetic field is obtained, which is very little dependent on small inequalities in the manufacturing of the angle indication arrangements.

Another preferred example of an angle indicating arrangement for two-phase feed is shown in Fig. 5. On the shaft 28 two winding coils 31 and 32 are fastened at a distance from each other. The said coils are coupled in series and are mutually similar. Each of the said coils is placed in a rotary space, which is surrounded by a magnetic winding 29 or 30 as the case may be. The magnetic windings are so arranged that at an alternating current feed a rectilinear magnetic field is created through the rotor space, which field is as homogeneous as possible. The magnetic windings constitute the two-phase windings of the stator winding arrangement. The angle between the plane of the winding coil 31 and the magnetic field through this coil diverges 90° from the angle between the plane of the winding coil 32 and the magnetic field through it. At two-phase feed the voltage induced in the coils 31 and 32 will evidently be created by superposition of the magnetic fields of the windings 29 and 30. The said superposed fields create a rotating magnetic field. The described example can also be used for three phases whereby among other things the shaft 28 is provided with three coils arranged at a distance from each other.

I claim:

1. Means for controlling the angular position of a directed shaft in correspondence with the positioning of a directing shaft comprising a pair of rotors respectively coaxial with and carried by the shafts each rotor including at least one coil having a winding disposed in a plane symmetrical with respect to its axis of rotation, means interconnecting the rotor windings in electrical series opposition whereby in-phase voltages induced in the rotors respectively tend to counteract each other when the rotors are in mutually identical positions relatively to their respective stator fields, substantially identical multiphase stator windings associated respectively with the rotors, means including a power source interconnecting said stator windings in series to thereby induce mutually in-phase rotating magnetic stator fields respectively adjacent the rotors, and reversible means for actuating the directed shaft to position the rotor carried thereby similarly to the rotor carried by the directing shaft, said reversible means including a multiphase electrical motor, means for energizing one of the phase windings of the said motor in accordance with the voltage induced in the rotor carried by the directing shaft and means for energizing the other phase winding of the motor in accordance with difference voltage between the said rotors, said rotor voltages being of constant magnitude and the system being in balance when said rotor voltages are 180° out of phase with relation to each other and out of balance when said rotor voltages are in any other phase relationship.

2. Means for controlling the rotation of a directed shaft from a remote point comprising a coil secured to the shaft and rotatable therewith and having a winding symmetrical with respect to said shaft, a directing shaft, a substantially like coil secured to and carried thereby, means connecting said coils in electrical series opposition, means for creating rotating magnetic fields respectively adjacent the shafts and containing said windings, said field-creating means being interconnected in electrical series, a source of multiple phase alternating current interconnected with the said field creating means, a multiple phase motor operative to rotate the directed shaft, means responsive to the voltage of the coil carried by the directing shaft for energizing one of the field windings of said motor and means responsive to the difference voltage between the coils for energizing another field winding of the motor, said last mentioned means being effective to operate the motor in one direction or the other in correspondence with phase differences in voltages generated in said coils by said fields, the voltages thereby generated in said coils being of equal and constant magnitude and the system being in balance when the said voltages are 180° out of phase with relation to each other and out of balance when said voltages are in any other phase relationship.

KARL BERTIL PALME.

REFERENCES CITED

The following references are of record in the file of this patent:

UNITED STATES PATENTS

| Number | Name | Date |
|---|---|---|
| 1,562,417 | Richter | Nov. 24, 1925 |
| 1,916,075 | Rowell | June 27, 1933 |
| 1,999,645 | Wittkuhns | Apr. 30, 1935 |
| 2,336,994 | MacKay | Dec. 14, 1943 |
| 2,464,629 | Young | Mar. 15, 1949 |
| 2,480,634 | Dawson | Aug. 30, 1949 |